US011852080B1

(12) United States Patent
O'Connor et al.

(10) Patent No.: US 11,852,080 B1
(45) Date of Patent: Dec. 26, 2023

(54) GEARBOX ASSEMBLY

(71) Applicant: General Electric Company, Schenectady, NY (US)

(72) Inventors: Ethan Patrick O'Connor, Hamilton, OH (US); Gert J. van der Merwe, Lebanon, OH (US); Barry L. Allmon, Matthews, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/817,852

(22) Filed: Aug. 5, 2022

(51) Int. Cl.
*F02C 7/36* (2006.01)
*F02C 7/06* (2006.01)

(52) U.S. Cl.
CPC ............... *F02C 7/36* (2013.01); *F02C 7/06* (2013.01); *F05D 2220/323* (2013.01); *F05D 2260/40311* (2013.01)

(58) Field of Classification Search
CPC combination set(s) only.
See application file for complete search history.

(56) References Cited

U.S. PATENT DOCUMENTS

| | | | |
|---|---|---|---|
| 2,085,483 A | 6/1937 | Trebucien | |
| 3,336,819 A | 8/1967 | Jones | |
| 4,164,155 A | 8/1979 | Reed et al. | |
| 8,235,862 B2 | 8/2012 | Sugitani | |
| 10,961,918 B1* | 3/2021 | Spruce | F16H 57/082 |
| 2011/0130246 A1* | 6/2011 | McCune | F16H 1/48 |
| | | | 29/700 |
| 2014/0161592 A1* | 6/2014 | Belmonte | F01D 25/16 |
| | | | 415/124.2 |
| 2016/0326964 A1* | 11/2016 | Curlier | F02K 3/072 |
| 2017/0159608 A1* | 6/2017 | Ertas | F16H 57/0006 |
| 2018/0030901 A1* | 2/2018 | Thornton | F16D 3/76 |
| 2019/0257213 A1* | 8/2019 | Zilli | F01D 21/045 |
| 2020/0003128 A1* | 1/2020 | Maguire | F01D 25/16 |
| 2021/0148287 A1* | 5/2021 | Husband | F02C 7/36 |

FOREIGN PATENT DOCUMENTS

| | | |
|---|---|---|
| CN | 206647505 U | 11/2017 |
| DE | 102012202450 A1 | 8/2013 |
| FR | 3105812 A1 | 7/2021 |
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| WO | 201792740 A1 | 6/2017 |

* cited by examiner

*Primary Examiner* — Binh Q Tran
(74) *Attorney, Agent, or Firm* — Venable LLP; Peter T. Hrubiec; Michele V. Frank (57) ABSTRACT

A gearbox assembly includes a first gear coupled to a first shaft, a second gear coupled to a second shaft, and a plurality of planet gears that mesh with the first gear and the second gear. The first shaft includes a first shaft stiff portion and a first shaft flexible portion that includes a greater flexibility than a flexibility of the first shaft stiff portion such that the first gear moves in a radial direction. The second shaft includes a second shaft stiff portion and a second shaft flexible portion that includes a greater flexibility than a flexibility of the second shaft stiff portion such that the second gear moves in the radial direction. The first gear and the second gear move to distribute loads substantially equally on the plurality of planet gears.

20 Claims, 3 Drawing Sheets

GEARBOX ASSEMBLY

STATEMENT REGARDING FEDERALLY SPONSORED RESEARCH OR DEVELOPMENT

This invention was made with government support under U.S. Government Contract Number NNC15BA05B/80GRC20F0188 awarded by the National Aeronautics and Space Administration (NASA). The U.S. Government may have certain rights in this invention.

TECHNICAL FIELD

The present disclosure relates generally to gearbox assemblies for turbine engines.

BACKGROUND

A turbine engine generally includes a fan and a core section arranged in flow communication with one another. Turbine engines can include one or more gearbox assemblies.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "stiff" or "stiffness" is the extent that an object resists deformation in response to an applied force on the object. The more stiff an object is, the less flexible the object is. Likewise, the more flexible an object is, the less stiff the object is.

As used herein, "flexible" or "flexibility" of an object is an amount the object is capable of moving or of bending in a radial direction without breaking. The greater the flexibility (e.g., lower stiffness), the greater amount the object can move in the radial direction without breaking. The lower the flexibility (e.g., greater stiffness), the lower amount the object can move in the radial direction without breaking.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

A turbine engine can be configured as a geared engine. Geared engines include a power gearbox utilized to transfer power from a turbine shaft to a main fan. Typically, such gearboxes may include a sun gear, a plurality of planet gears, and a ring gear. The sun gear meshes with the plurality of planet gears and the plurality of planet gears mesh with the ring gear. In operation, the gearbox transfers the torque transmitted from the turbine shaft operating at a first speed to a fan shaft rotating at a second, lower speed. For example, torque is transferred through the sun gear, to the plurality of planet gears, and to the ring gear. The plurality of planet gears may include compound gears such that the plurality of planet gears each include a first stage and a second stage. A compound gear is a gear with multiple gears that are coaxially aligned. Each gear of a compound gear is referred to as a "stage."

The gears are aligned radially when the power gearbox is assembled. If the gears are arranged tightly within the gearbox, then the gears are not able to move during gearbox operation. During manufacturing, the gears may not be perfectly radially aligned about the centerline. Thus, as torque is transferred through the gearbox, a load from the sun gear on the plurality of planet gears is distributed unevenly to the various planet gears. In this way, one planet gear experiences more load than the other planet gears, and the gears may become unbalanced. Current gearboxes utilize a flexible diaphragm on the shaft that allows the sun gear, the plurality of planet gears, or the ring gear to "float" such that the gears can move or can deflect radially during operation and distribute the load substantially evenly between the various gears. Such gearbox arrangements with a sun gear, a plurality of planet gears, and a ring gear, however, allow only for relatively high gear ratios (e.g., speed of the output is much lower than speed of the input), are relatively large, and are relatively heavy. Further, current gearboxes utilize a single row bearing (e.g., a ball bearing having a single row of balls or a roller bearing having a single row of roller elements) to provide an overturning moment stiffness and a radial stiffness on the shafts. Such arrangements, however, may not adequately provide an overturning moment stiffness or a radial stiffness to counteract the axial loads and the radial loads when the axial loads and the radial loads are high loads or are constant loads. For example, high loads for a particular size and a particular speed of the bearing are when traction forces are so great such that the bearing elements or the bearing races may deform.

Accordingly, embodiments of the present disclosure provide for an improved gearbox assembly that allows for a lower gear ratio as compared to gearbox assemblies without the benefit of the present disclosure. Embodiments of the present disclosure include two sun gears and no ring gear. Thus, the gearbox assembly of the present disclosure reduces the size of the gearbox assembly and provides for reduced weight as compared to gearbox assemblies without the benefit of the present disclosure. The gearbox assembly of the present disclosure utilizes compound planet gears that each includes two planet gear stages. The compound planet gears are stiffly mounted with two sun gears on flexible shafts (e.g., an input shaft and an output shaft). For example, the input shaft includes a first sun gear and the output shaft includes a second sun gear. The input shaft and the output shaft each include a stiff portion and a flexible portion that extends axially from the stiff portion. The flexible portion has a greater flexibility than a flexibility of the stiff portion, as detailed further below. The flexible portion includes a stiffness that is less than a stiffness of the stiff portion.

The flexibility of the flexible portion allows the sun gears to "float" and deflect radially such that the load through the gearbox assembly is distributed substantially evenly from the sun gears to the planet gears. For example, the gearbox assembly of the present disclosure allows the sun gears to float by providing an input shaft and an output shaft with radial flexibility such that restoring radial forces on the sun gear is a percentage of the transmitted load from a respective planet gear during operation. The flexibility of the input shaft and the output shaft is tuned such that the sun gear radial positional restoring force is approximately twenty percent or less of a respective planet gear radial transmitted load. In this way, the input shaft and the output shaft allow the sun gear to recenter or to realign radially within a positional centroid of the planet gears. The floating sun gears transmit the loads onto the planet gears substantially equally to produce improved stress on the gears, and, thus, improve the life of the gears and of the gearbox compared to gearboxes without the benefit of the present disclosure. The flexibility of the flexible portion is achieved by the flexible portion being cantilevered from the stiff portion, the flexible portion having a diameter that is less than a diameter of the stiff portion, the flexible portion having a wall with a thickness that is less than a thickness of a wall of the stiff portion, the flexible portion having a different modulus of elasticity than the stiff portion, the flexible portion having a different stiffness than the stiff portion, or combinations thereof. Forward and aft duplex bearings provide for additional flexibility. For example, the shafts are cantilevered from the duplex bearings such that the sun gears are cantilevered and can deflect in the radial direction, as detailed above.

The duplex bearings overcome detrimental low thrust and radial loading conditions while providing robustness to significant periodic thrust loads (e.g., including thrust crossovers). During operation, the sun gears experience load variations, such as, for example, continuous low radial loads (e.g., 1G and unbalanced), continuous low/no pressure balance thrust loads with intermittent spline lock thrust load, and overturning moments. The embodiments of the present disclosure provide primary flexibility (e.g., the cantilevered sun gears) and secondary flexibility (e.g., the duplex bearings that provide overturning moment stiffness and inner race shafting hairpin) to address the load variations, as detailed further below. The gears can be straight spur gears, helical gears, or bi-helical gears. The planet gears are supported by either roller bearings or journal bearings. The gearbox assembly of the present disclosure provides for lower gear ratios with an inline configuration for higher power applications, as compared to gearbox assemblies without the benefit of the present disclosure.

Figure 1:
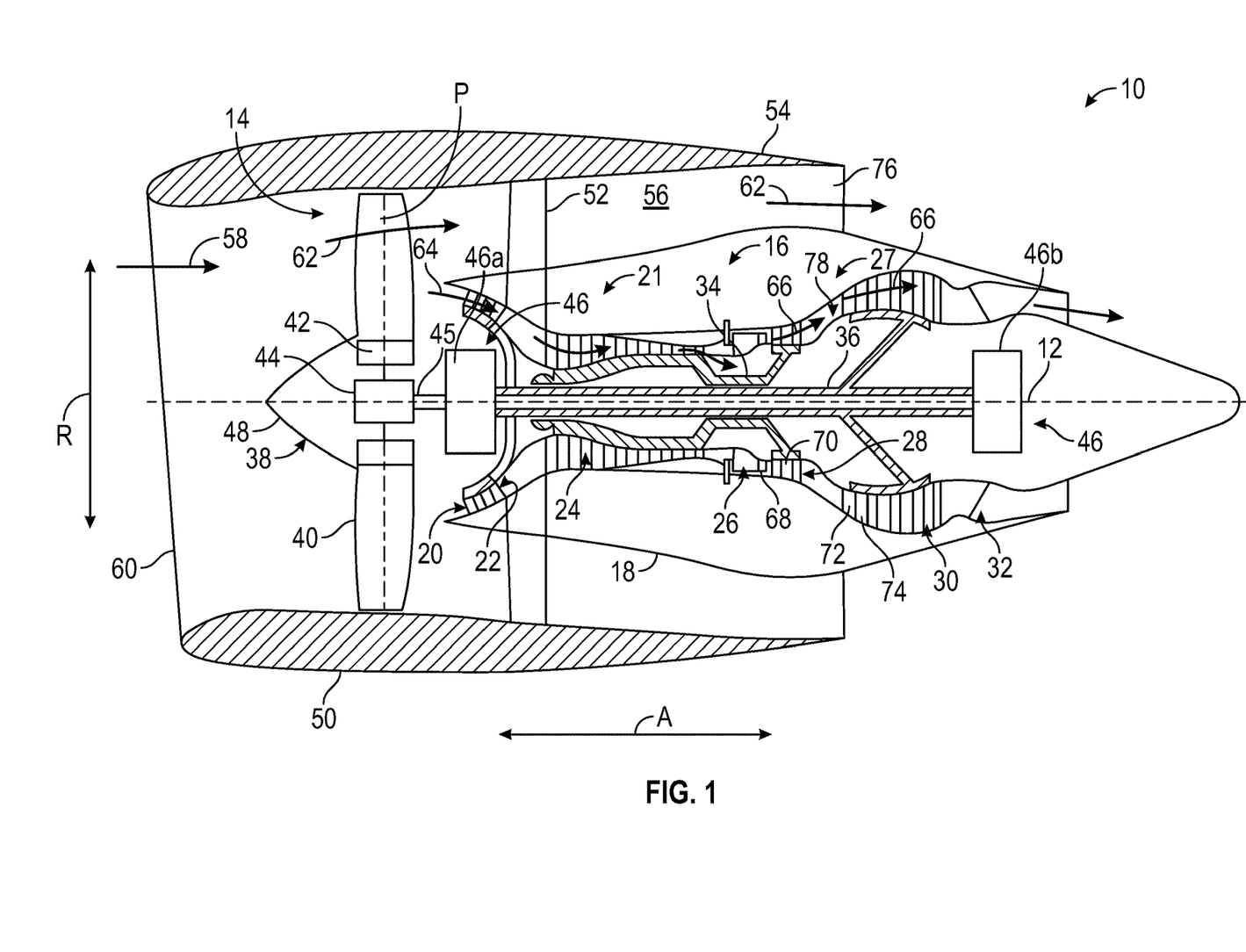
FIG. 1 is a schematic cross-sectional diagram of a turbine engine, taken along a centerline axis of the turbine engine, according to an embodiment of the present disclosure.

Referring now to the drawings, FIG. 1 is a schematic cross-sectional diagram of a turbine engine 10, taken along a centerline axis of the turbine engine 10, according to an embodiment of the present disclosure. As shown in FIG. 1, the turbine engine 10 defines an axial direction A (extending parallel to a longitudinal, centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

The turbine engine 10 includes one or more power gearboxes, also referred to as gearbox assemblies 46. For example, the turbine engine 10 includes a first gearbox assembly 46a and a second gearbox assembly 46b. The first gearbox assembly 46a is coupled to a fan shaft 45 and to the LP shaft 36, as detailed further below. The second gearbox assembly 46b is coupled to the LP shaft 36 and can be coupled to an electric machine assembly for providing mechanical power to the LP shaft 36 or for generating electrical power, as detailed further below.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the centerline axis 12 via the fan shaft 45 that is powered by the LP shaft 36 across the first gearbox assembly 46a. The first gearbox assembly 46a is shown schematically in FIG. 1. The first gearbox assembly 46a includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the first gearbox assembly 46a.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines.

Figure 2:
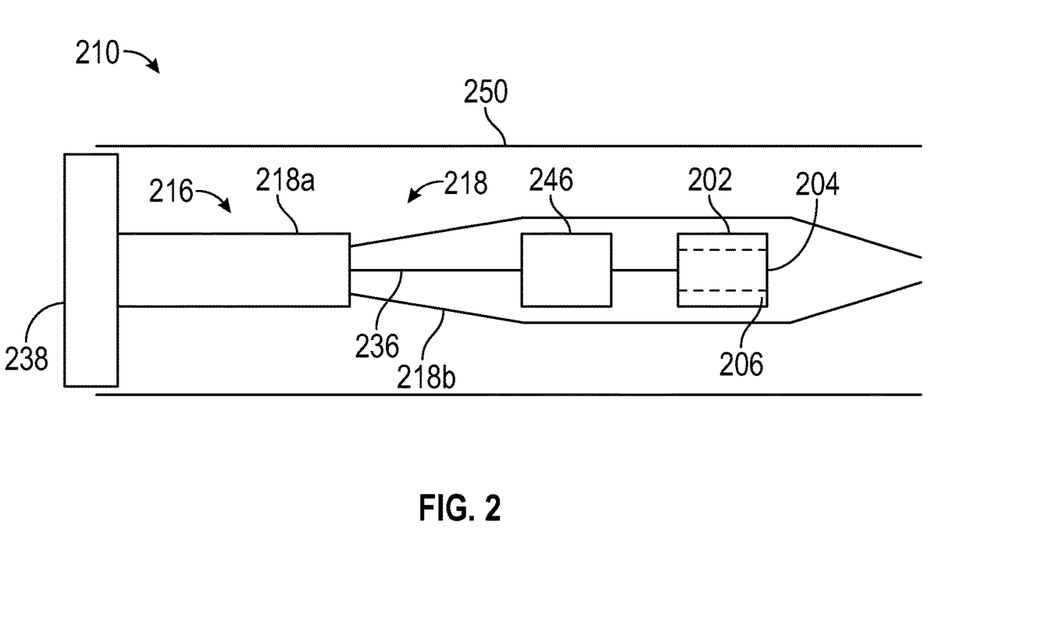
FIG. 2 is a schematic diagram of another turbine engine, according to another embodiment of the present disclosure.

FIG. 2 is a schematic diagram of another turbine engine 210, according to another embodiment of the present disclosure. The turbine engine 210 includes many of the same components and functionality as the turbine engine 10 (FIG. 1). The turbine engine 210 includes a core turbine engine 216. The core turbine engine 216 includes many of the same or similar components as the core turbine engine 16 as described in FIG. 1. The turbine engine 210, however, is a turboprop engine such the turbine engine 210 includes a propeller 238 instead of a fan 38 as shown in FIG. 1. The turbine engine 210 may be any type of turbine engine, as detailed above, and may be implemented as the turbine engine 10 (FIG. 1). The inlet of the core turbine engine 216 in a turbofan arrangement is located at an aft end of the engine. In some embodiments, the inlet of the core turbine engine 216 is located on the forward end of the engine.

The turbine engine 210 includes a casing 218 (shown schematically in FIG. 2) that encases the core turbine engine 216, an electric machine assembly 202, and a gearbox assembly 246. A forward portion 218a of the casing 218 encases the core turbine engine 216, and an aft portion 218b of the casing 218 encases the electric machine assembly 202 and the gearbox assembly 246. A nacelle 250 circumferentially surrounds the casing 218 and provides a body for coupling the turbine engine 210 to an aircraft. A shaft (e.g., an LP turbine shaft) of the core turbine engine 216 rotates the propeller 238 through a power gearbox as described in FIG. 1. The power gearbox of the core turbine engine 216 is considered a first gearbox assembly and the gearbox assembly 246 is considered a second gearbox assembly. In this way, the turbine engine 210 includes a plurality of gearbox assemblies.

The electric machine assembly 202 is coupled to a driveshaft 236 through the gearbox assembly 246, as detailed further below. The driveshaft 236 couples the propeller 238 to the core turbine engine 216. For example, the driveshaft 236 may be the LP shaft 36 as described in FIG. 1. The electric machine assembly 202 generally includes a rotor 204 fixedly coupled to the driveshaft 236 (e.g., through the gearbox assembly 246) and a stator 206, which remains stationary. Additionally, the electric machine assembly 202 includes an electrical line for electrically connecting the stator 206 or the rotor 204 to a power source or to a power sink. The electric machine assembly 202 is depicted as an in-runner electric machine assembly (e.g., an electric machine assembly 202 with the rotor 204 located radially inward of the stator 206). In some embodiments, the electric machine assembly 202 is an out-runner electric machine assembly with the stator 206 located radially inward of the rotor 204. The electric machine assembly 202 may have any suitable configuration including, for example, an axial flux configuration.

The electric machine assembly 202 includes an electric generator and an electric motor. For example, the electric machine assembly 202 can operate as an electric generator that generates electrical power from the turbine engine 210 (e.g., utilize a rotation of the driveshaft 236 to generate electrical power). Alternatively, the electric machine assembly 202 can operate as an electric motor that adds mechanical power to the turbine engine 210 (e.g., to drive or to assist in driving the driveshaft 236). In this way, the electric machine assembly 202 provides, extracts, transmits, and/or converts mechanical power and electrical power to or from the turbine engine 210. In some embodiments, the electric machine assembly 202 is an all-electric start motor that supplies energy to start the turbine engine 210. In some embodiments, the electric machine assembly 202 provides electrical power to any number of mechanical or electrical systems of the turbine engine 210 or of a corresponding aircraft to which the turbine engine 210 is mounted. For example, the electric machine assembly 202 can provide electrical power to instrumentation, computers, sensors, accessories, etc. FIG. 2 shows the gearbox assembly 246 and the electric machine assembly 202 are mounted in an aft portion of the turbine engine 210. In some embodiments, the gearbox assembly 246 and the electric machine assembly 202 are mounted in a forward portion of the turbine engine 210. The gearbox assembly 246 and the electric machine assembly 202 can be mounted anywhere in the turbine engine 210, as desired.

Figure 3:
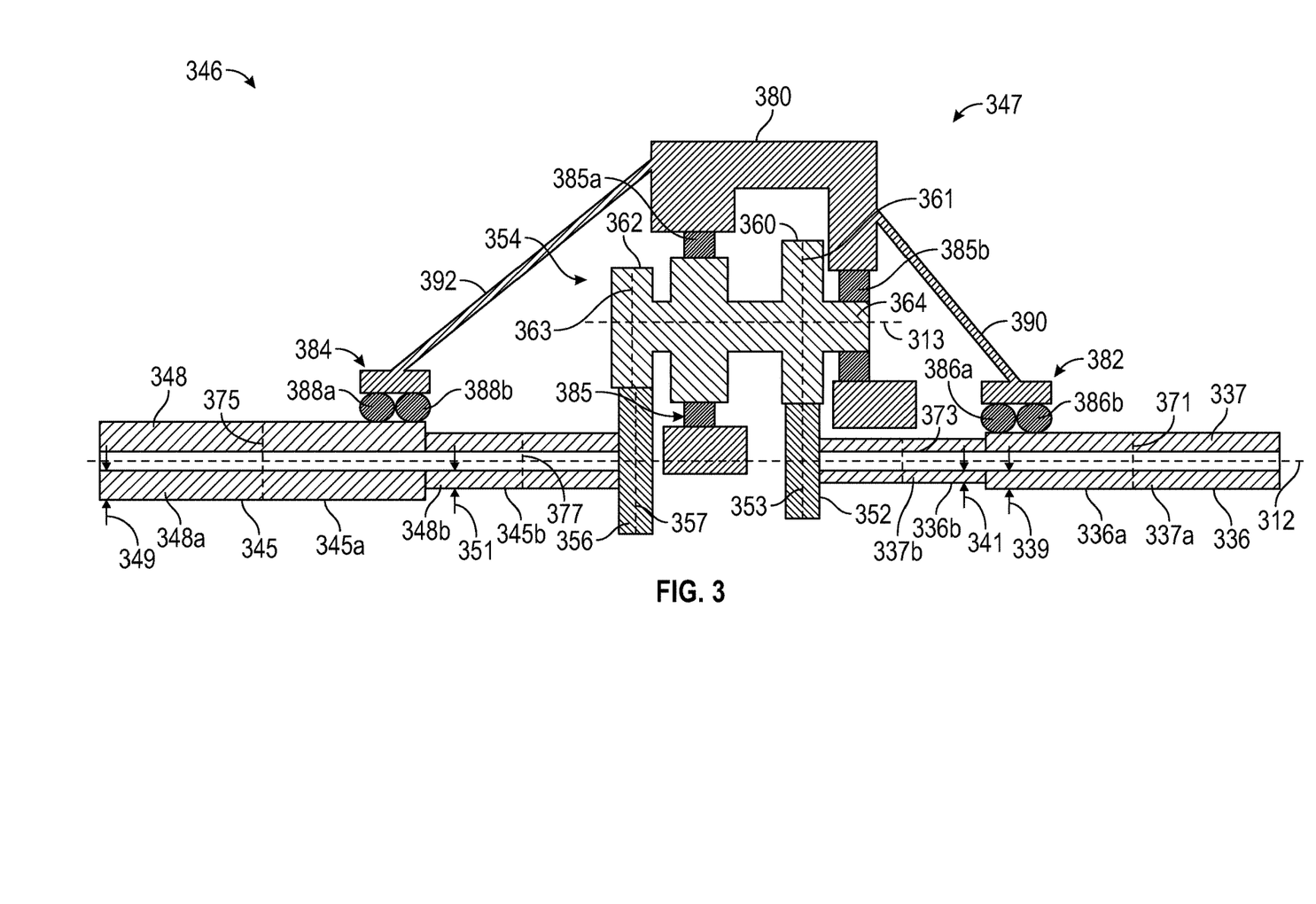
FIG. 3 is a schematic, cross-sectional side view of a gearbox assembly for a turbine engine, taken along a centerline axis of the gearbox assembly, according to an embodiment of the present disclosure.

FIG. 3 is a schematic, cross-sectional side view of a gearbox assembly 346, taken along a centerline axis 312 of the gearbox assembly 346, according to an embodiment of the present disclosure. The gearbox assembly 346 can be used in the turbine engine 10 (FIG. 1) or the turbine engine 210 (FIG. 2). For example, the gearbox assembly 346 may be utilized as the first gearbox assembly 46a (FIG. 1), the second gearbox assembly 46b (FIG. 1), or the gearbox assembly 246 (FIG. 2). The gearbox assembly 346 includes gear assembly 347 in a compound symmetrical arrangement. For example, the gear assembly 347 includes one or more compound gears having multiple stages. The gear assembly 347 includes a first sun gear 352, a plurality of planet gears 354 (only one of which is visible in FIG. 2), and a second sun gear 356. For clarity, only a portion of the gears is shown. The gearbox assembly 346 is a star type gearbox arrangement, in which a planet carrier 380 is fixed and stationary. In such an arrangement, the fan 38 (FIG. 1) or the driveshaft 236 (FIG. 2) is driven by the second sun gear 356.

A first shaft 336 is coupled to the first sun gear 352. The first shaft 336 is coupled to the turbine section 27 (FIG. 1) or is coupled to the electric machine assembly (FIG. 2). For example, the first shaft 336 is coupled to the LP shaft 36 (FIG. 1) or is coupled to the rotor 204 (FIG. 2). Radially outward of the first sun gear 352, and intermeshing therewith, is the plurality of planet gears 354 that are coupled together and supported by the planet carrier 380. The planet carrier 380 supports and constrains the plurality of planet gears 354 such that the plurality of planet gears 354 do not together rotate about the first sun gear 352 while enabling each planet gear of the plurality of planet gears 354 to rotate about its own axis 313. The gearbox assembly 346 does not include a ring gear. Instead, the second sun gear 356 meshes with the plurality of planet gears 354 such that the plurality of planet gears 354 transfer torque to the second sun gear 356 to rotate the second sun gear 356. A second shaft 345 is coupled to the second sun gear 356 such that rotation of the second sun gear 356 causes the second shaft 345 to rotate. The second shaft 345 is coupled to the fan shaft 45 (FIG. 1) or is coupled to the driveshaft 236 (FIG. 2). The gearbox assembly 346 is an inline gearbox assembly such that the second shaft 345 is disposed axially in line with the first shaft 336. The first sun gear 352 includes a first sun gear diameter 353 that is less than a second sun gear diameter 357 of the second sun gear 356.

Each of the plurality of planet gears 354 is a compound gear that includes a first stage planet gear 360 and a second stage planet gear 362 coupled together and supported by a layshaft 364. The first stage planet gear 360 includes a first stage planet gear diameter 361 that is greater than a second stage planet gear diameter 363 of the second stage planet gear 362. Each of the first sun gear 352, the plurality of planet gears 354, and the second sun gear 356 comprises gear teeth about their periphery to intermesh with the other gears. For example, the gear teeth can be spur gear teeth, helical gear teeth, bi-helical gear teeth, or any type of gear teeth arrangement. The first stage planet gear 360 meshes with the first sun gear 352 and the second stage planet gear 362 meshes with the second sun gear 356. The diameters of the gears (e.g., the first sun gear 352, the second sun gear 356, the first stage planet gear 360, and the second stage planet gear 362) provide for a gear ratio between 1.4:1 to 4:1. In this way, the gearbox assembly 346 allows for lower gear ratios as compared to gearbox assemblies without the benefit of the present disclosure. Thus, the rotation speed of the second shaft 345 more closely matches the rotation speed of the first shaft 336 (e.g., or vice versa) as compared to gearbox assemblies without the benefit of the present disclosure.

Each of the plurality of planet gears 354 is supported within the planet carrier 380 by a plurality of roller bearings 385. The plurality of roller bearings 385 are generally cylindrical and allow rotation of the plurality of planet gears 354 with respect to the planet carrier 380. In some embodiments, the plurality of roller bearings 385 may be ball bearings. The plurality of roller bearings 385 include a first set of roller bearings 385a and a second set of roller bearings 385b. The first set of roller bearings 385a are located at a forward end of the plurality of planet gears 354 and the second set of roller bearings 385b are located at an aft end of the plurality of planet gears 354. A lubrication system supplies lubrication (e.g., oil) to the plurality of roller bearings 385. FIG. 3 shows four roller bearings 385, but a respective planet gear 354 can include any number of roller bearings 385, as desired. The planet carrier 380 is a stiff member such that the plurality of planet gears 354 do not substantially move axially or do not substantially move radially during operation of the gearbox assembly 346.

The first shaft 336 includes a first shaft stiff portion 336a and a first shaft flexible portion 336b that extends axially from the first shaft stiff portion 336a. The first shaft flexible portion 336b has a greater flexibility than a flexibility of the first shaft stiff portion 336a. In this way, the first shaft flexible portion 336b moves or deflects in a radial direction by a greater amount than the first shaft stiff portion 336a. In other words, the first shaft stiff portion 336a is stiffer than the first shaft flexible portion 336b such that a moment of inertia of the first shaft stiff portion 336a is greater than a moment of inertia of the first shaft flexible portion 336b, and the first shaft stiff portion 336a does not move in a radial direction as much as the first shaft flexible portion 336b. Accordingly, a stiffness of the first shaft flexible portion 336b is less than a stiffness of the first shaft stiff portion 336a. The flexibility of the first shaft flexible portion 336b is tuned such that a radial positional restoring force of the first sun gear 352 is approximately twenty percent (20%) or less of a radial transmitted load of a respective planet gear 354. In this way, the first shaft flexible portion 336b allows the first sun gear 352 to recenter or to realign radially within a positional centroid of the plurality of planet gears 354.

The first shaft 336 is a hollow shaft that includes a first shaft wall 337 that defines a central bore through the first shaft 336. The first shaft wall 337 includes first shaft wall first portion 337a and a first shaft wall second portion 337b. The first shaft wall first portion 337a defines a first shaft wall first thickness 339. The first shaft wall second portion 337b defines a first shaft wall second thickness 341. The first shaft wall second thickness 341 is less than the first shaft wall first thickness 339. The first shaft stiff portion 336a includes a first shaft stiff portion diameter 371 (e.g., an outer diameter of the first shaft stiff portion 336a). The first shaft flexible portion 336b includes a first shaft flexible portion diameter 373 (e.g., an outer diameter of the first shaft flexible portion 336b). The first shaft flexible portion diameter 373 is less than the first shaft stiff portion diameter 371.

The flexibility of the first shaft flexible portion 336b can be tuned to provide a desired flexibility of the first shaft flexible portion 336b such that the first sun gear 352 can float (e.g., can move in a radial direction with respect to the first shaft stiff portion 336a) to distribute the loads on the plurality of planet gears 354, as desired. For example, the moment of inertia of the first shaft flexible portion 336b is selected to be different than (e.g., less than) the moment of inertia of the first shaft stiff portion 336a such that the first shaft flexible portion 336b has a greater flexibility than the flexibility of the first shaft stiff portion 336a. In this way, the flexibility of the first shaft flexible portion 336b is tuned by changing the first shaft flexible portion diameter 373, by changing a length of the first shaft flexible portion 336b, by changing the first shaft wall second thickness 341, or combinations thereof, to achieve a desired flexibility with respect to the first shaft stiff portion 336a. In some embodiments, a material (e.g., a modulus of elasticity) of the first shaft flexible portion 336b is different than a material (e.g., a modulus of elasticity) of the first shaft stiff portion 336a to achieve a desired flexibility.

The second shaft 345 includes a second shaft stiff portion 345a and a second shaft flexible portion 345b that extends axially from the second shaft stiff portion 345a. The second shaft flexible portion 345b has a greater flexibility than a flexibility of the second shaft stiff portion 345a. In this way, the second shaft flexible portion 345b moves or deflects in a radial direction by a greater amount than the second shaft stiff portion 345a. In other words, the second shaft stiff portion 345a is stiffer than the second shaft flexible portion 345b such that a moment of inertia of the second shaft stiff portion 345a is greater than a moment of inertia of the second shaft flexible portion 345b, and the second shaft stiff portion 345a does not move in a radial direction as much as the second shaft flexible portion 345b. Accordingly, a stiffness of the second shaft flexible portion 345b is less than a stiffness of the second shaft stiff portion 345a. The flexibility of the second shaft flexible portion 345b is tuned such that a radial positional restoring force of the second sun gear 356 is approximately twenty percent (20%) or less of a radial transmitted load of a respective planet gear 354. In this way, the second shaft flexible portion 345b allows the second sun gear 356 to recenter or to realign radially within a positional centroid of the plurality of planet gears 354.

The second shaft 345 is a hollow shaft that includes a second shaft wall 348 that defines a central bore through the second shaft 345. The second shaft wall 348 includes second shaft wall first portion 348a and a second shaft wall second portion 348b. The second shaft wall first portion 348a defines a second shaft wall first thickness 349. The second shaft wall second portion 348b defines a second shaft wall second thickness 351. The second shaft wall second thickness 351 is less than the second shaft wall first thickness 349. The second shaft stiff portion 345a includes a second shaft stiff portion diameter 375 (e.g., an outer diameter of the second shaft stiff portion 345a). The second shaft flexible portion 345b includes a second shaft flexible portion diameter 377 (e.g., an outer diameter of the second shaft flexible portion 345b). The second shaft flexible portion diameter 377 is less than the second shaft stiff portion diameter 375.

The flexibility of the second shaft flexible portion 345b can be tuned to provide a desired flexibility of the second shaft flexible portion 345b such that the second sun gear 356 can float (e.g., can move in a radial direction with respect to the second shaft stiff portion 345a) to distribute the loads on the plurality of planet gears 354, as desired. For example, the moment of inertia of the second shaft flexible portion 345b is selected to be different than (e.g., less than) the moment of inertia of the second shaft stiff portion 345a such that the second shaft flexible portion 345b has a greater flexibility than the flexibility of the second shaft stiff portion 345a. In this way, the flexibility of the second shaft flexible portion 345b is tuned by changing the second shaft flexible portion diameter 377, by changing a length of the second shaft flexible portion 345b, by changing the second shaft wall second thickness 351, or combinations thereof, to achieve a desired flexibility. In some embodiments, a material (e.g., a modulus of elasticity) of the second shaft flexible portion 345b is different than a material (e.g., a modulus of elasticity) of the second shaft stiff portion 345a to achieve a desired flexibility.

The gearbox assembly 346 includes a first duplex bearing 382 and a second duplex bearing 384. The first duplex bearing 382 is located aft of the second duplex bearing 384. The first duplex bearing 382 supports the first shaft 336 and the second duplex bearing 384 supports the second shaft 345. The first duplex bearing 382 includes a first set of bearing elements 386a and a second set of bearing elements 386b. The first set of bearing elements 386a and the second set of bearing elements 386b may include any number of bearing elements, as desired. The first duplex bearing 382 is coupled to the planet carrier 380 (e.g., fixed and stationary) via one or more first linkages 390. The second duplex bearing 384 includes a first set of bearing elements 388a and a second set of bearing elements 388b. The first set of bearing elements 388a and the second set of bearing elements 388b may include any number of bearing elements, as desired. The second duplex bearing 384 is coupled to the planet carrier 380 (e.g., fixed and stationary) via one or more second linkages 392. FIG. 3 shows the bearing elements 386a, 386b, 388a, 388b are ball bearing. In some embodiments, the bearing elements 386a, 386b, 388a, 388b are cylindrical roller bearings.

The first shaft 336 is aligned such that the first duplex bearing 382 supports the first shaft 336 at a transition between the first shaft stiff portion 336a and the first shaft flexible portion 336b. In this way, the first shaft 336 and the sun gear 352 are cantilevered from the first duplex bearing 382 (e.g., the first shaft flexible portion 336b is cantilevered). For example, the first shaft flexible portion 336b extends axially from the first shaft stiff portion 336a and the first shaft flexible portion 336b is cantilevered from the first shaft stiff portion 336a. The first shaft 336 being cantilevered in such a way provides for additional flexibility of the first shaft 336 as compared to shafts without the benefit of the present disclosure. The additional flexibility allows the first sun gear 352 to float such that loads are distributed through the first sun gear 352 to the plurality of planet gears 354, as desired. The first duplex bearing 382 provides additional support as compared to single bearings. For example, the first duplex bearing 382 provides support for the first shaft 336 in both a radial direction and an axial direction. The first duplex bearing 382 provides overturning moment stiffness that provides additional support for the first duplex bearing 382. For example, by providing the first set of bearing elements 386a and the second set of bearing elements 386b, the first duplex bearing 382 reacts to an overturning moment of the first shaft 336 due to radial movement of the first sun gear 352. Accordingly, the first duplex bearing 382 maintains an axial position of the first sun gear 352 relative to the plurality of planet gears 354 while simultaneously providing an overturning moment stiffness and a radial stiffness for adverse rotor dynamics (e.g., when the axial loads and the radial loads are low or intermittent). For example, low loads for a particular size and a particular speed of the bearing are when traction forces are insignificant such that the bearing elements "skid" or slide instead of roll. Repetitive skidding of the bearing elements leads to failure of the bearing.

Similarly, the second shaft 345 is aligned such that the second duplex bearing 384 supports the second shaft 345 at a transition between the second shaft stiff portion 345a and the second shaft flexible portion 345b. In this way, the second shaft 345 and the second sun gear 356 are cantilevered from the second duplex bearing 384 (e.g., the second shaft flexible portion 345b is cantilevered). For example, the second shaft flexible portion 345b extends axially from the second shaft stiff portion 345a and the second shaft flexible portion 345b is cantilevered from the second shaft stiff portion 345a. The second shaft 345 being cantilevered in such a way provides for additional flexibility of the second shaft 345 as compared to shafts without the benefit of the present disclosure. The additional flexibility allows the second sun gear 356 to float such that loads can be distributed through the second sun gear 356 to the plurality of planet gears 354, as desired. The second duplex bearing 384 provides additional support as compared to single bearings. For example, the second duplex bearing 384 provides support for the second shaft 345 in both a radial direction and an axial direction. The second duplex bearing 384 provides overturning moment stiffness that provides additional support for the second duplex bearing 384. For example, by providing the first set of bearing elements 388a and the second set of bearing elements 388b, the second duplex bearing 384 reacts to the overturning moment of the second shaft 345 due to radial movement of the second sun gear 356. Accordingly, the second duplex bearing 384 maintains an axial position of the second sun gear 356 relative to the plurality of planet gears 354 while simultaneously providing overturning moment stiffness and radial stiffness for adverse rotor dynamics (e.g., when the axial loads and the radial loads are low or intermittent).

As detailed above, the embodiments of the present disclosure reduce an overall size of the gearbox assembly and provide for lower gear ratios as compared to gearbox assemblies without the benefit of the present disclosure. Accordingly, the embodiments described herein reduce the weight of the gearbox assembly, and, thus, reduce the overall weight of the turbine engine. Therefore, the embodiments of the present disclosure provide for improved efficiency of the turbine engine in the conversion of kinetic energy in the fluid stream to mechanical energy in the turbine shaft, and provide for higher power as compared to gearbox assemblies and turbine engines without the benefit of the present disclosure.

Further aspects are provided by the subject matter of the following clauses.

A gearbox assembly comprises a first gear, a second gear, and a plurality of planet gears. The first gear is coupled to a first shaft, the first shaft including a first shaft stiff portion and a first shaft flexible portion, the first shaft flexible portion including a greater flexibility than a flexibility of the first shaft stiff portion such that the first gear moves in a radial direction with respect to the first shaft stiff portion. The second gear is coupled to a second shaft, the second shaft including a second shaft stiff portion and a second shaft flexible portion, the second shaft flexible portion including a greater flexibility than a flexibility of the second shaft stiff portion such that the second gear moves in the radial direction with respect to the second shaft stiff portion. Each planet gear of the plurality of planet gears meshing with the first gear and the second gear, the first gear and the second gear moving in the radial direction to distribute loads substantially equally on the plurality of planet gears.

The gearbox assembly of the preceding clause, the first gear being a first sun gear and the second gear is a second sun gear.

The gearbox assembly of any preceding clause, each planet gear of the plurality of planet gears including a first stage planet gear and a second stage planet gear, the first stage planet gear meshing with the first gear and the second stage planet gear meshing with the second gear.

The gearbox assembly of any preceding clause, the first shaft flexible portion including a first shaft flexible portion diameter that is less than a first shaft stiff portion diameter of the first shaft stiff portion.

The gearbox assembly of any preceding clause, the second shaft flexible portion including a second shaft flexible portion diameter that is less than a second shaft stiff portion diameter of the second shaft stiff portion.

The gearbox assembly of any preceding clause, the first shaft flexible portion being cantilevered from the first shaft stiff portion.

The gearbox assembly of any preceding clause, the second shaft flexible portion being cantilevered from the second shaft stiff portion.

The gearbox assembly of any preceding clause, further including a first bearing that supports the first shaft, the first shaft being cantilevered from the first bearing The gearbox assembly of any preceding clause, further including a second bearing that supports the second shaft, the second shaft being cantilevered from the second bearing.

The gearbox assembly of any preceding clause, the first bearing being a first duplex bearing and the second bearing is a second duplex bearing.

The gearbox assembly of any preceding clause, the first shaft being an input shaft of a turbine engine, and the second shaft being an output shaft of the turbine engine.

The gearbox assembly of any preceding clause, the first gear including a first gear diameter and the second gear including a second gear diameter, the first gear diameter being less than the second gear diameter.

The gearbox assembly of any preceding clause, the gearbox assembly not including a ring gear.

The gearbox assembly of any preceding clause, the first stage planet gear including a first stage planet gear diameter that is greater than a second stage planet gear diameter of the second stage planet gear.

The gearbox assembly of any preceding clause, the first shaft stiff portion including a first shaft wall first thickness and the first shaft flexible portion including a first shaft wall second thickness, the first shaft wall second thickness being less than the first shaft wall first thickness.

The gearbox assembly of any preceding clause, the second shaft stiff portion including a second shaft wall first thickness and the second shaft flexible portion including a second shaft wall second thickness, the second shaft wall second thickness being less than the second shaft wall first thickness.

The gearbox assembly of any preceding clause, a modulus of elasticity of the first shaft flexible portion being different than a modulus of elasticity of the first shaft stiff portion.

The gearbox assembly of any preceding clause, a modulus of elasticity of the first shaft flexible portion being different than a modulus of elasticity of the first shaft stiff portion.

The gearbox assembly of any preceding clause, a torque being transferrable from the first shaft to the second shaft through the gearbox assembly.

A turbine engine comprises a first shaft, a second shaft, and a gearbox assembly. The gearbox assembly comprises a first gear, a second gear, and a plurality of planet gears. The first gear is coupled to the first shaft, the first shaft including a first shaft stiff portion and a first shaft flexible portion, the first shaft flexible portion including a greater flexibility than a flexibility of the first shaft stiff portion such that the first gear moves in a radial direction with respect to the first shaft stiff portion. The second gear coupled to the second shaft, the second shaft including a second shaft stiff portion and a second shaft flexible portion, the second shaft flexible portion including a greater flexibility than a flexibility of the second shaft stiff portion such that the second gear moves in the radial direction with respect to the second shaft stiff portion. Each planet gear of the plurality of planet gears meshing with the first gear and the second gear, the first gear and the second gear moving in the radial direction to distribute loads substantially equally on the plurality of planet gears.

The turbine engine of the preceding clause, the first gear being a first sun gear and the second gear being a second sun gear.

The turbine engine of any preceding clause, each planet gear of the plurality of planet gears including a first stage planet gear and a second stage planet gear, the first stage planet gear meshing with the first gear and the second stage planet gear meshing with the second gear.

The turbine engine of any preceding clause, the first shaft flexible portion including a first shaft flexible portion diameter that is less than a first shaft stiff portion diameter of the first shaft stiff portion.

The turbine engine of any preceding clause, the second shaft flexible portion including a second shaft flexible portion diameter that is less than a second shaft stiff portion diameter of the second shaft stiff portion.

The turbine engine of any preceding clause, the first shaft flexible portion being cantilevered from the first shaft stiff portion.

The turbine engine of any preceding clause, the second shaft flexible portion being cantilevered from the second shaft stiff portion.

The turbine engine of any preceding clause, further including a first bearing that supports the first shaft, the first shaft being cantilevered from the first bearing.

The turbine engine of any preceding clause, further including a second bearing that supports the second shaft, the second shaft being cantilevered from the second bearing gear.

The turbine engine of any preceding clause, the first bearing being a first duplex bearing and the second bearing being a second duplex bearing.

The turbine engine of any preceding clause, the first gear including a first gear diameter and the second gear including a second gear diameter, the first gear diameter being less than the second gear diameter.

The turbine engine of any preceding clause, the gearbox assembly not including a ring gear.

The turbine engine of any preceding clause, the first stage planet gear including a first stage planet gear diameter that is greater than a second stage planet gear diameter of the second stage planet gear.

The turbine engine of any preceding clause, the first shaft stiff portion including a first shaft wall first portion thickness and the first shaft flexible portion including a first shaft wall second portion thickness, the first shaft wall second portion thickness being less than the first shaft wall first portion thickness.

The turbine engine of any preceding clause, the second shaft stiff portion including a second shaft wall first portion thickness and the second shaft flexible portion including a second shaft wall second portion thickness, the second shaft wall second portion thickness being less than the second shaft wall first portion thickness.

The turbine engine of any preceding clause, a modulus of elasticity of the first shaft flexible portion being different than a modulus of elasticity of the first shaft stiff portion.

The turbine engine of any preceding clause, a modulus of elasticity of the first shaft flexible portion being different than a modulus of elasticity of the first shaft stiff portion.

The turbine engine of any preceding clause, the first shaft being an input shaft, and the second shaft being an output shaft.

The turbine engine of any preceding clause, a torque being transferrable from the first shaft to the second shaft through the gearbox assembly.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gearbox assembly comprising:
   a first gear coupled to a first shaft, the first shaft including a first shaft stiff portion and a first shaft flexible portion, the first shaft flexible portion including a greater flexibility than a flexibility of the first shaft stiff portion such that the first gear moves in a radial direction with respect to the first shaft stiff portion;
   a second gear coupled to a second shaft, the second shaft including a second shaft stiff portion and a second shaft flexible portion, the second shaft flexible portion including a greater flexibility than a flexibility of the second shaft stiff portion such that the second gear moves in the radial direction with respect to the second shaft stiff portion; and a plurality of planet gears, each planet gear of the plurality of planet gears meshing with the first gear and the second gear, the first gear and the second gear moving in the radial direction to distribute loads substantially equally on the plurality of planet gears.

2. The gearbox assembly of claim 1, wherein the first shaft is an input shaft of a turbine engine, and the second shaft is an output shaft of the turbine engine.

3. The gearbox assembly of claim 1, wherein the first gear is a first sun gear and the second gear is a second sun gear.

4. The gearbox assembly of claim 1, wherein each planet gear of the plurality of planet gears includes a first stage planet gear and a second stage planet gear, wherein the first stage planet gear meshes with the first gear and the second stage planet gear meshes with the second gear.

5. The gearbox assembly of claim 1, wherein the first shaft flexible portion includes a first shaft flexible portion diameter that is less than a first shaft stiff portion diameter of the first shaft stiff portion.

6. The gearbox assembly of claim 5, wherein the second shaft flexible portion includes a second shaft flexible portion diameter that is less than a second shaft stiff portion diameter of the second shaft stiff portion.

7. The gearbox assembly of claim 1, wherein the first shaft flexible portion is cantilevered from the first shaft stiff portion.

8. The gearbox assembly of claim 7, wherein the second shaft flexible portion is cantilevered from the second shaft stiff portion.

9. The gearbox assembly of claim 1, further including a first bearing that supports the first shaft, the first shaft being cantilevered from the first bearing.

10. The gearbox assembly of claim 9, further including a second bearing that supports the second shaft, the second shaft being cantilevered from the second bearing.

11. The gearbox assembly of claim 10, wherein the first bearing is a first duplex bearing and the second bearing is a second duplex bearing.

12. A turbine engine comprising:
a first shaft;
a second shaft; and
a gearbox assembly comprising:
   a first gear coupled to the first shaft, the first shaft including a first shaft stiff portion and a first shaft flexible portion, the first shaft flexible portion including a greater flexibility than a flexibility of the first shaft stiff portion such that the first gear moves in a radial direction with respect to the first shaft stiff portion;
   a second gear coupled to the second shaft, the second shaft including a second shaft stiff portion and a second shaft flexible portion, the second shaft flexible portion including a greater flexibility than a flexibility of the second shaft stiff portion such that the second gear moves in the radial direction with respect to the second shaft stiff portion; and
   a plurality of planet gears, each planet gear of the plurality of planet gears meshing with the first gear and the second gear, the first gear and the second gear moving in the radial direction to distribute loads substantially equally on the plurality of planet gears.

13. The turbine engine of claim 12, wherein the first gear is a first sun gear and the second gear is a second sun gear.

14. The turbine engine of claim 12, wherein each planet gear of the plurality of planet gears includes a first stage planet gear and a second stage planet gear, wherein the first stage planet gear meshes with the first gear and the second stage planet gear meshes with the second gear.

15. The turbine engine of claim 12, wherein the first shaft flexible portion includes a first shaft flexible portion diameter that is less than a first shaft stiff portion diameter of the first shaft stiff portion.

16. The turbine engine of claim 15, wherein the second shaft flexible portion includes a second shaft flexible portion diameter that is less than a second shaft stiff portion diameter of the second shaft stiff portion.

17. The turbine engine of claim 12, wherein the first shaft flexible portion is cantilevered from the first shaft stiff portion.

18. The turbine engine of claim 17, wherein the second shaft flexible portion is cantilevered from the second shaft stiff portion.

19. The turbine engine of claim 12, further including a first bearing that supports the first shaft, the first shaft being cantilevered from the first bearing.

20. The turbine engine of claim 19, further including a second bearing that supports the second shaft, the second shaft being cantilevered from the second bearing.

* * * * *